United States Patent [19]
Galli

[11] Patent Number: 5,882,106
[45] Date of Patent: Mar. 16, 1999

[54] THIN PROFILE LASER POINTER ASSEMBLY

[76] Inventor: Robert Galli, 8176 Horseshoe Bend La., Las Vegas, Nev. 89113

[21] Appl. No.: 988,252

[22] Filed: Dec. 10, 1997

[51] Int. Cl.[6] ..................................................... F21L 7/00
[52] U.S. Cl. .......................... 362/259; 362/109; 362/119; 372/36
[58] Field of Search .................................... 362/109, 118, 362/119, 120, 187, 188, 259; 372/36, 50, 103, 705

[56] References Cited

U.S. PATENT DOCUMENTS

| | | |
|---|---|---|
| 4,683,573 | 7/1987 | Albanese . |
| 5,029,335 | 7/1991 | Fisher et al. ............................... 372/36 |
| 5,119,280 | 6/1992 | Yang ........................................ 362/187 |
| 5,158,356 | 10/1992 | Guthrie .................................... 362/188 |
| 5,193,897 | 3/1993 | Halsey ..................................... 362/118 |
| 5,255,167 | 10/1993 | Toussaint et al. ....................... 362/259 |
| 5,268,829 | 12/1993 | Lo . |
| 5,297,218 | 3/1994 | Hanaoka . |
| 5,303,251 | 4/1994 | Zelenka . |
| 5,307,253 | 4/1994 | Jehn . |
| 5,317,581 | 5/1994 | Onishi et al. . |
| 5,335,150 | 8/1994 | Huang . |
| 5,343,376 | 8/1994 | Huang ..................................... 362/259 |
| 5,446,635 | 8/1995 | Jehn . |
| 5,450,148 | 9/1995 | Shu et al. ................................ 362/259 |
| 5,473,464 | 12/1995 | Knowles et al. . |
| 5,617,304 | 4/1997 | Huang ..................................... 362/259 |
| 5,618,099 | 4/1997 | Brubacher ............................... 362/259 |
| 5,663,828 | 9/1997 | Knowles et al. ........................ 362/118 |
| 5,685,636 | 11/1997 | German ................................... 362/187 |
| 5,697,700 | 12/1997 | Huang ..................................... 362/259 |

*Primary Examiner*—Laura Tso
*Attorney, Agent, or Firm*—Barlow, Josephs & Holmes, Ltd.

[57] ABSTRACT

A thin profile laser pointer assembly includes a thin profile laser head, a constant voltage laser diode driver circuit, and a coin cell power source all packaged within a thin-profile rectangular housing having a thickness between about 2.0 mm and about 6.0 mm. The laser head includes a thin, rectangular heat sink and a laser diode mounted on a recessed shelf on a front edge of the heat sink. The laser head is slidably received in a mounting channel in a front portion of the housing. The arrangement of the laser head and mounting channel rigidly fixes the laser diode in the X and Z axes while permitting sliding linear movement of the laser diode along a "Y" axis, which defines the optical axis of the laser diode. A lens is mounted in the mounting channel along the optical axis, and a projecting aperture is formed in the front edge of the housing in front of the lens for allowing the laser beam to exit through the front of the housing. The laser beam is focused by sliding the laser head within the channel. The laser diode driver circuit and a contact switch are mounted on a circuit board received and secured over the housing. Contact pads on the circuit board engage corresponding contacts on the battery and laser head assembly to complete the circuit. The constant voltage power regulating circuit utilizes a simple shunt regulator circuit which monitors voltage drain as the battery decays and draws appropriate current levels to provide constant power to the laser diode.

22 Claims, 10 Drawing Sheets

THIN PROFILE LASER POINTER ASSEMBLY

BACKGROUND AND SUMMARY OF THE INVENTION

The instant invention relates to laser pointer devices, and more particularly to a laser pointer assembly having a thin profile laser head and housing structure.

Figure 1:
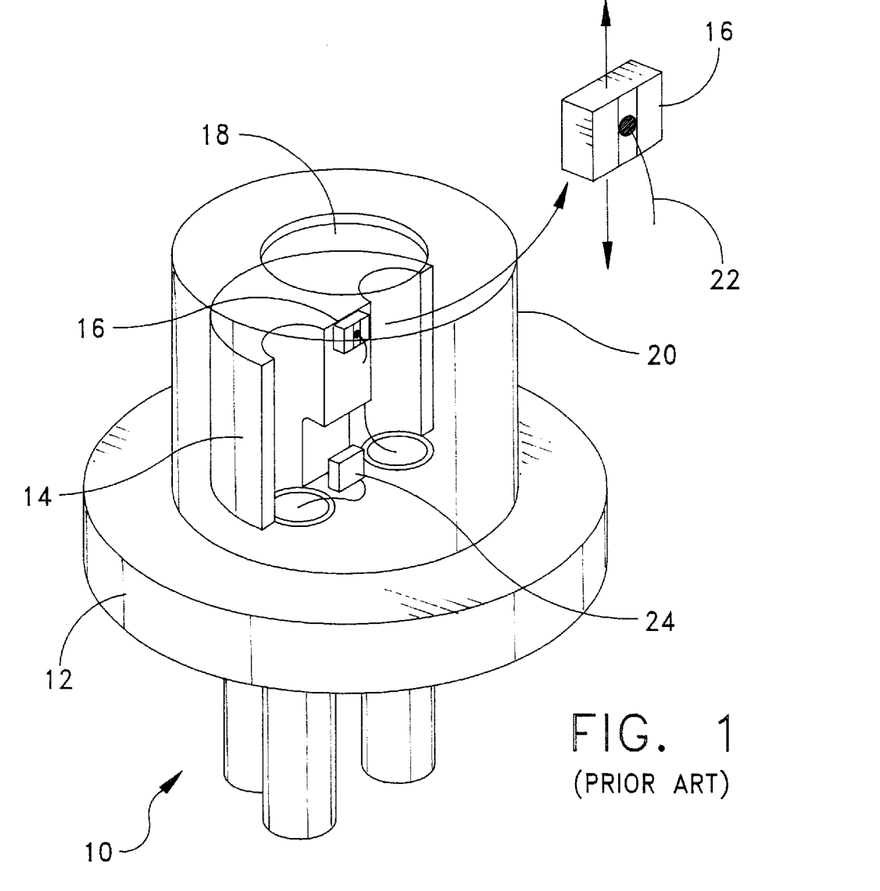
FIG. 1 is a perspective view of a prior art cylindrical laser head assembly.
Figure 1A:
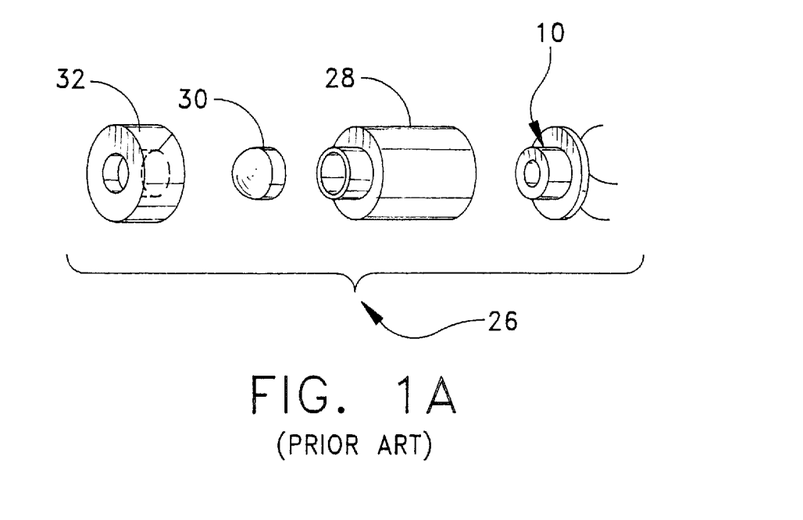
FIG. 1A is an exploded perspective view of a typical prior art laser module.
Figure 2:
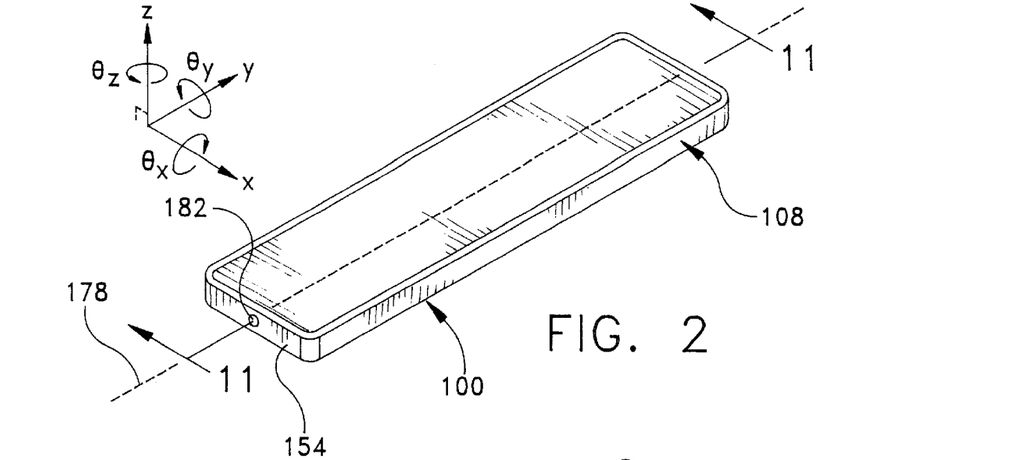
FIG. 2 is a perspective view of the laser pointer assembly of the present invention.

Laser pointing devices are generally well known in the prior art. In this regard, the U.S. Patents to Lo U.S. Pat. No. 5,268,829; Jehn U.S. Pat. No. 5,307,253; Huang U.S. Pat. No. 5,335,150; Knowles U.S. Pat. No. 5,473,464; and Jehn U.S. Pat. No. 5,446,635 are representative of the current state of the art. As will be apparent from a review of the above-noted laser pointer devices, it is a common design feature that the laser pointer devices are packaged in cylindrical housings. The reason for this common feature is the fact that many commercially available laser diodes are pre-packaged in a cylindrical can assembly such as that generally indicated at 10 in FIG. 1. Referring to FIG. 1, the prior art laser head 10 include a cylindrical mounting head 12 having an integral heat sink 14, a laser diode 16 mounted on the heat sink 14, and a window 18 supported in front of the laser diode 16 by a protective housing 20, or "can" as commonly referred to in the art. The can 20 provides a protective enclosure around the laser diode 16 and the wire bond connection 22 to prevent physical harm to the laser diode 16 and wire bond 22 during manufacture and use. These types of laser heads also typically include a photo-diode sensor 24 for monitoring light levels emitted from the laser diode. While these type of laser head assemblies 10 are highly effective and reliable, the physical characteristics of the cylindrical mounting head 12 limit the housing configurations to generally cylindrical constructions as shown in the above-noted patents, or alternatively to other housing structures having a minimum thickness which is limited by the outer diameter of the mounting head 12 plus the dimensions of any modular housing in which the laser head 10 is mounted. The laser head assemblies 10, which are typically referred to as transistor outline packages, are commercially sold in 2 standard sizes, namely 5.6 mm and 9 mm. Referring to FIG. 1A (prior art), a typical laser module of the prior art is illustrated and generally indicated at 26. The module assembly 26 comprises a laser head assembly 10, a mounting body 28, a collimating lens 30, and lens cap 32. Taking into account the smallest diameter of the transistor outline package 5.6 mm, and the necessary module housing in which it is mounted, a conventional laser module cannot be constructed any smaller than about 7.0 mm in diameter, or thickness. The laser module 26 is usually then mounted in another housing which in turn adds another 2–3 mm in diameter or thickness to the device, making the total diameter or thickness, no smaller than 9–10 mm. Accordingly, it is impossible to design a truly thin housing package from this type of laser head. As stated previously, while the existing laser head assemblies are highly effective, there is nevertheless a perceived industry need and consumer desire for laser mounting heads which have flatter packaging configurations than those currently available.

Accordingly, the instant invention provides a thin profile laser pointer assembly which incorporates a thin profile laser head, a simple constant voltage laser diode driver circuit, and a coin cell power source, all packaged into a thin profile housing which has a thickness of between about 2.0 and 6.0 mm.

The laser head comprises a thin, rectangular heat sink having parallel side edges, and further includes a laser diode mounted on a recessed shelf on a front edge of the heat sink. More specifically, the heat sink includes a recessed shelf at the inner end of an outwardly diverging slot formed in the front edge of the heat sink. The recessed shelf extends inwardly from the lower surface approximately half-way between the upper and lower surfaces of the heat sink, and the laser diode is mounted on the forward edge of the shelf. The wire bond from the laser diode passes through an aperture located next to the shelf to a contact pad on the upper surface of the heat sink body. The recessed shelf and slot protect the laser diode and wire bond from physical damage during handling and manufacturing thereof The housing comprises a thin rectangular body having a bottom wall and upwardly extending side walls. The rectangular heat sink is slidably received in an elongate rectangular mounting channel formed in a front portion of the housing. The mating parallel sides of the heat sink and mounting channel rigidly fix the laser diode in X and Z axes of a 90° angle reference system while also permitting sliding linear movement of the laser diode along a "Y" axis, which defines the optical axis of the laser head assembly. The heat sink and mounting channel also positively fix rotation $\theta_x$, $\theta_y$, and $\theta_z$ of the laser diode around the X, Y and Z axes. A collimating lens is mounted at the front of the channel along the optical axis, and a projecting aperture is formed in the front wall of the housing in front of the lens for allowing the laser beam to exit through the front wall of the housing. The laser beam is focused through the lens by sliding the laser head assembly forwardly or rearwardly within the mounting channel to the proper longitudinal position. The laser head assembly is secured in focused position in the channel by an adhesive.

The battery is received in a circular recess formed in the rear portion of the housing. A hinged door is formed in the bottom wall of the housing for access to the battery after assembly.

The laser diode driver circuit and a switch are mounted on a two-sided circuit board which is received and secured over the open top of the shallow housing to form the top wall of the housing. Selectively placed contact pads on the circuit board engage corresponding electrical contact surfaces on the battery and laser head to complete the electrical circuit. The diode driver circuit utilizes a simple shunt voltage regulator which monitors laser voltage as the battery decays and adjusts current flow to provide constant voltage to the laser diode. More specifically, an operating circuit voltage is compared to the internal reference voltage of the shunt regulator. If the two values are the same, nothing happens. But, if the operating circuit voltage is higher than the reference, then the amplifier of the shunt regulator will draw more current from the battery reducing the overall voltage level to the diode.

A protective overlay sheet is mounted onto the upper surface of the circuit board to complete assembly of the laser pointer device. The overlay sheet protects and hides the electronic surface of the circuit board and can be provided with custom logo imprints for customized marketing of the laser pointer.

Accordingly, among the objects of the instant invention are: the provision of a laser pointer assembly having a thin profile housing with a thickness between about 2.0 mm and about 6.0 mm, and most preferably about 3.5 mm; the provision of a laser pointer assembly including a thin profile laser head; the provision of a laser pointer assembly wherein the thin profile laser head is slidably mounted in an elongate mounting channel; the provision of such a laser pointer assembly wherein the laser head and the mounting channel rigidly fix the laser diode in X and Z axes of a 90° angle reference system, while also permitting linear sliding movement in the Y axis; the provision of such a laser pointer assembly wherein the laser head and mounting channel further fix rotation $\theta_x$, $\theta_y$, and $\theta_z$ of the laser diode around the X, Y, and Z axes; the provision of such a laser pointer assembly wherein a collimating lens is mounted at the forward end of the mounting channel and focusing of the laser beam is accomplished by sliding the laser head forward and backward within the mounting channel; the provision of thin profile laser head wherein the laser diode is mounted on a recessed shelf of a heat sink body to protect the laser diode and wire bond from harm during handling and manufacturing; the provision of a laser pointer assembly including a power regulator circuit which operates on constant voltage rather than constant current; the provision of a laser pointer assembly having a power regulator circuit which has no photodiode feedback loop; the provision of a laser pointer assembly having a power regulator circuit which uses a shunt-type voltage regulator; and the provision of a laser pointer assembly having a power regulator circuit with a shunt-type voltage regulator that uses the internal resistance of the battery to limit current to the shunt regulator.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Referring now to the drawings, the laser pointer assembly of the instant invention is illustrated and generally indicated at 100 in FIGS. 2–14. As will hereinafter be more fully described, the instant invention provides a thin profile laser pointer assembly 100 which incorporates a thin profile laser head generally indicated at 102, a constant voltage laser diode driver circuit generally indicated at 104, and a coin cell power source generally indicated at 106, all packaged in a thin profile, elongate rectangular housing generally indicated at 108. For purposes of further discussion and an understanding of the term "thin-profile", the housing 108 is understood to have a generally uniform thickness of preferably between about 2.0 mm and about 6.0 mm and more preferably about 3.5 mm.

Figure 5:
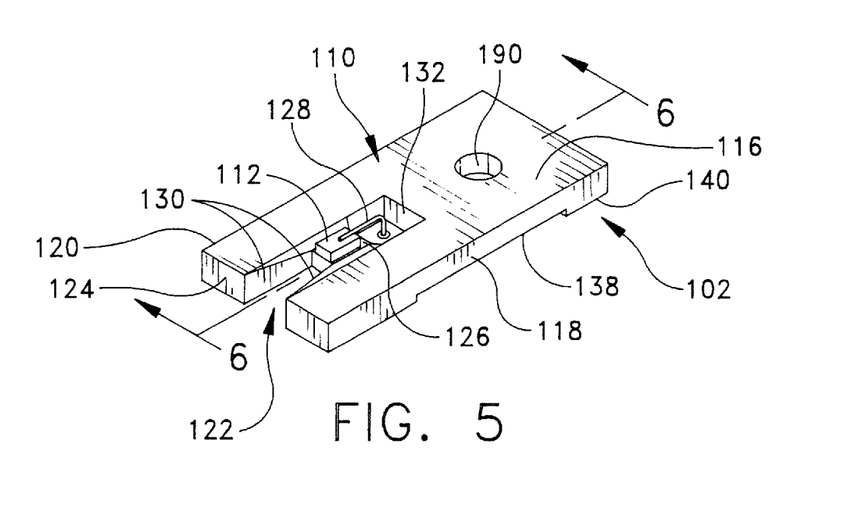
FIG. 5 is a bottom perspective view thereof.
Figure 6:
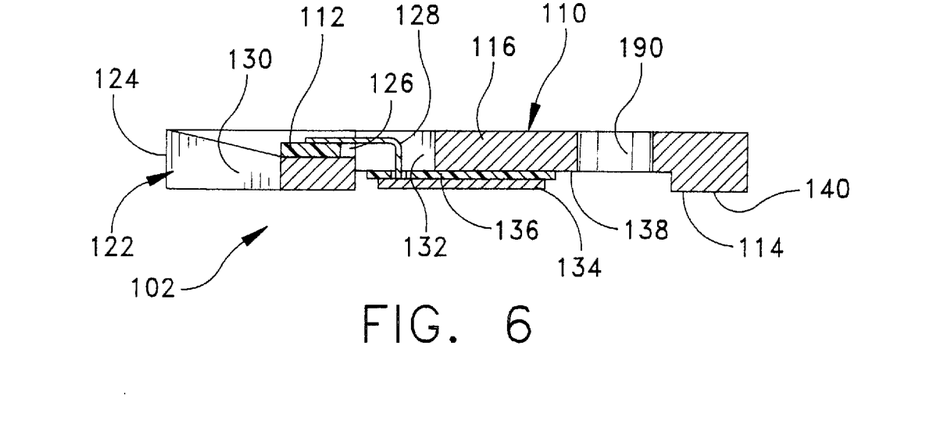
FIG. 6 is a cross-sectional view thereof as taken along line 6—6 of FIG. 5.
Figure 6A:
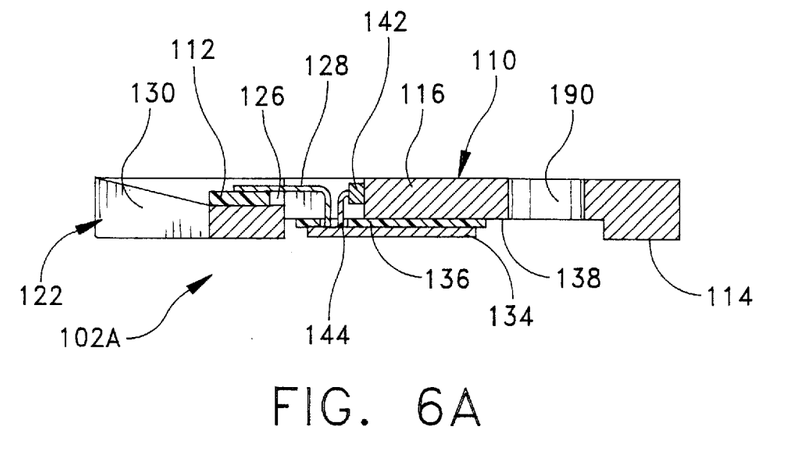
FIG. 6A is a cross-sectional view of an alternate embodiment of the laser head assembly including a photodiode feedback sensor.

Referring to FIGS. 3–6, the laser head 102 generally comprises a heat sink 110 and a conventional laser diode 112 mounted onto the heat sink 110. The heat sink 110 is shaped as a thin, metallic, rectangular body having opposed upper and lower surfaces 114, 116 respectively, parallel side walls 118, 120 respectively, and an outwardly diverging slot 122 formed in the front edge 124 of the heat sink 110. Referring to FIGS. 5 and 6, the laser diode 112 is mounted on a recessed shelf 126 located at the inner end of the diverging slot 122. The recessed shelf 126 is recessed inwardly from the lower surface 116 of the heat sink body approximately half-way between the upper and lower surfaces 116, 118 thereof. The recessed shelf 126 functions to protect the laser diode 112 and associated wire bond 128 from physical damage during handling and manufacturing thereof. The recessed shelf 126 further functions to place the laser diode 112 at a vertical mid-point in the housing 108 extending along an optical axis which passes longitudinally through the housing 108. The optical axis and positioning of the laser diode 112 within the housing 108 will be described in detail at a later point herein. Referring to FIG. 6, the laser diode 112 is mounted on the forward edge of the shelf 126 wherein laser light emitted from the laser diode 112 projects forwardly between the outwardly diverging sidewalls 130 of the slot 122. The wire bond 128 from the laser diode 112 extends through an aperture 132 located next to the shelf 126 to a contact pad 134 on the upper surface 114 of the heat sink body 110. The contact pad 134 is insulated from the heat sink body 110 by an insulating pad 136.

In mounting the laser diode 112, the heat sink body 110 becomes a positive contact while the wire bond contact pad 134 forms a negative contact. It is noted that the insulating pad 136 and wire bond contact pad 134 are mounted in a recessed area 138 of the top surface 114 of the heat sink 110 so that the entire laser head 102 is generally contained within the planar outline of the heat sink body 110. As will be further described herein after, the rear ledge 140 on the upper surface 114 of the heat sink body 110 will form a positive contact area for the electrical circuit while the contact pad 134 forms a negative contact.

Figure 7:
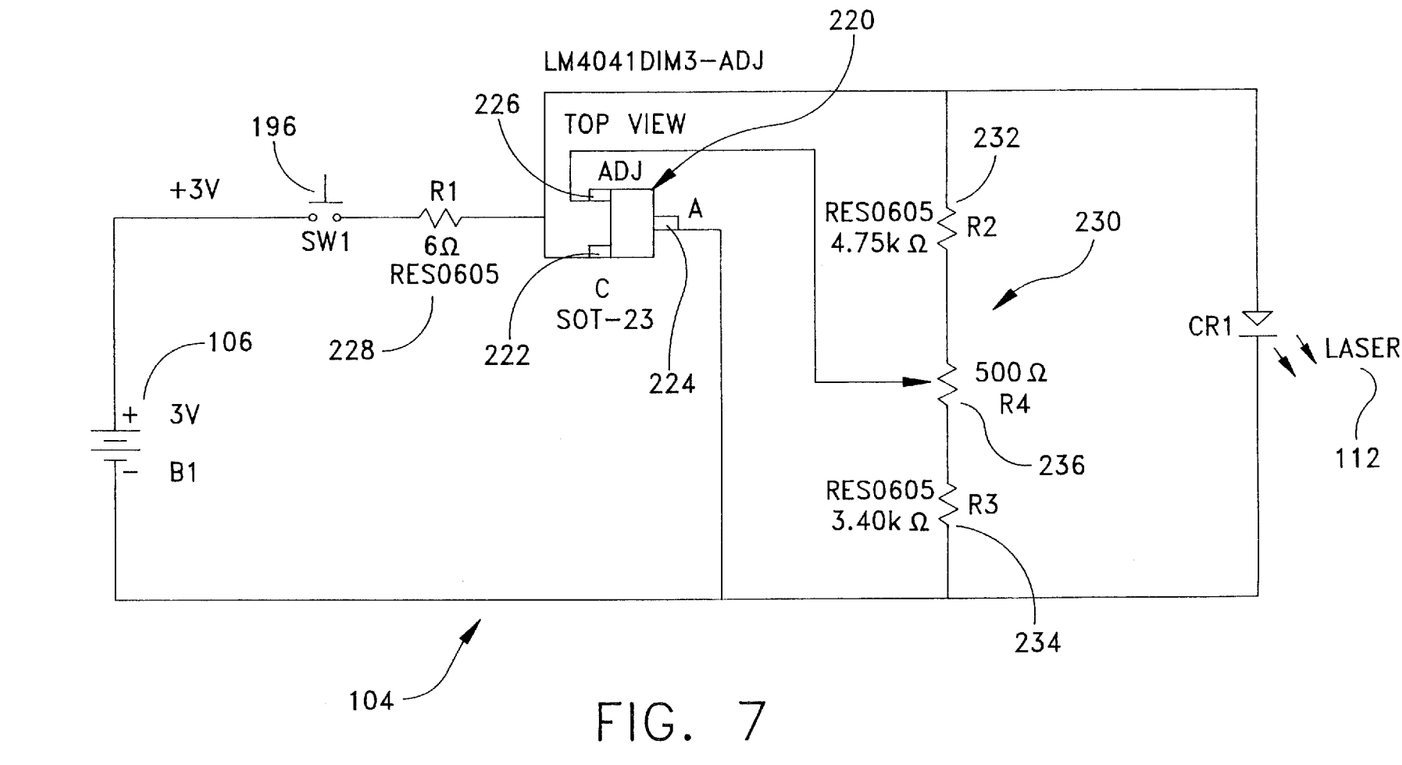
FIG. 7 is a schematic view of the constant voltage laser diode driver circuit.
Figure 8:
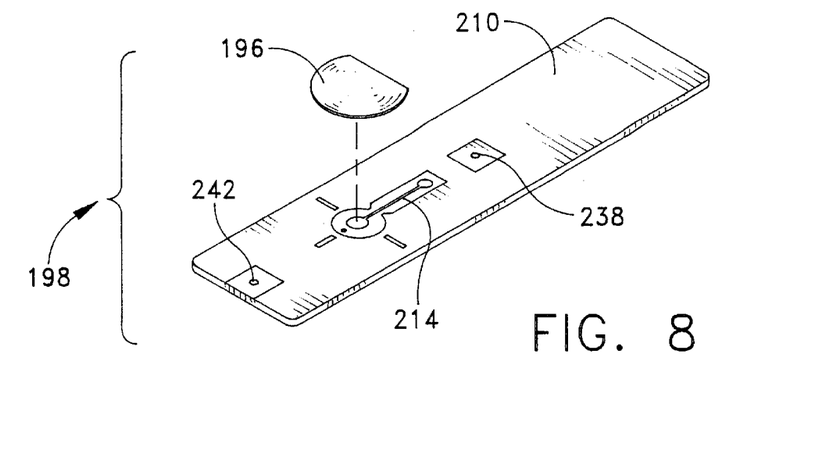
FIG. 8 is an exploded perspective view of the circuit board assembly.
Figure 9:
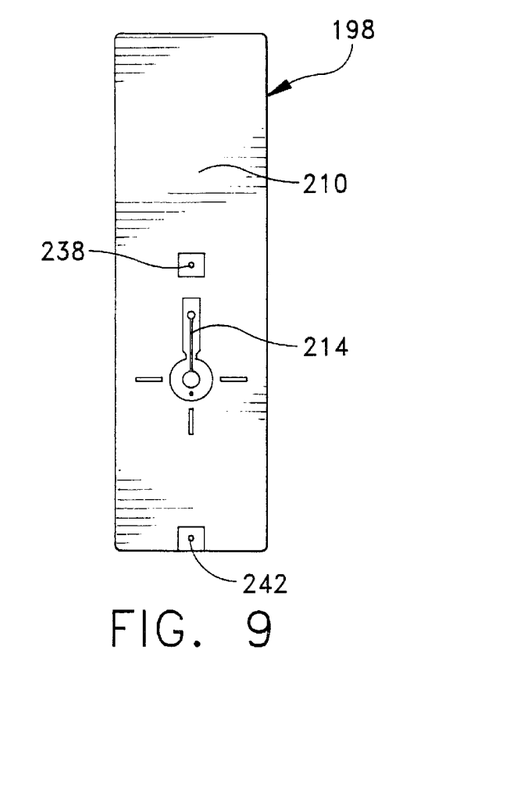
FIG. 9 is a top view thereof.
Figure 10:
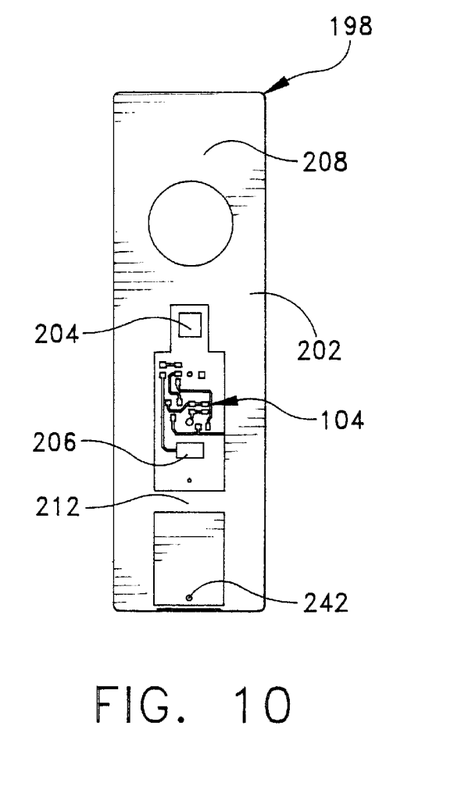
FIG. 10 is a bottom view thereof.

Those skilled in the art will note the absence of a photodiode in the preferred embodiment of the laser head 102, and will further note the absence of a photodiode feedback loop in the laser diode diver circuit 104 (FIG. 7). This is because the laser diode driver circuit 104 operates on a constant voltage arrangement which does not require precise measurement of emitted light to regulate power. Detailed specifics of the present laser diode driver circuit 104 will be described in full detail hereinbelow. For those applications of the laser head 102 where a photodiode feedback loop would be appropriate, a photodiode 142 could be located on the heat sink 110 at an appropriate location behind the laser diode 112 (See FIG. 6A), or on the insulating pad 136, or any other location in the vicinity to the laser chip. In this regard, a wire bond 144 from the photodiode 142 would also pass through the insulated pad 136 to a separate contact pad (not shown) on the upper surface of the heat sink body 110. In an application such as this, the upper contact pad 134 would likely be split into side-by-side panels (not shown) for engagement with corresponding pads on a circuit board.

Figure 3:
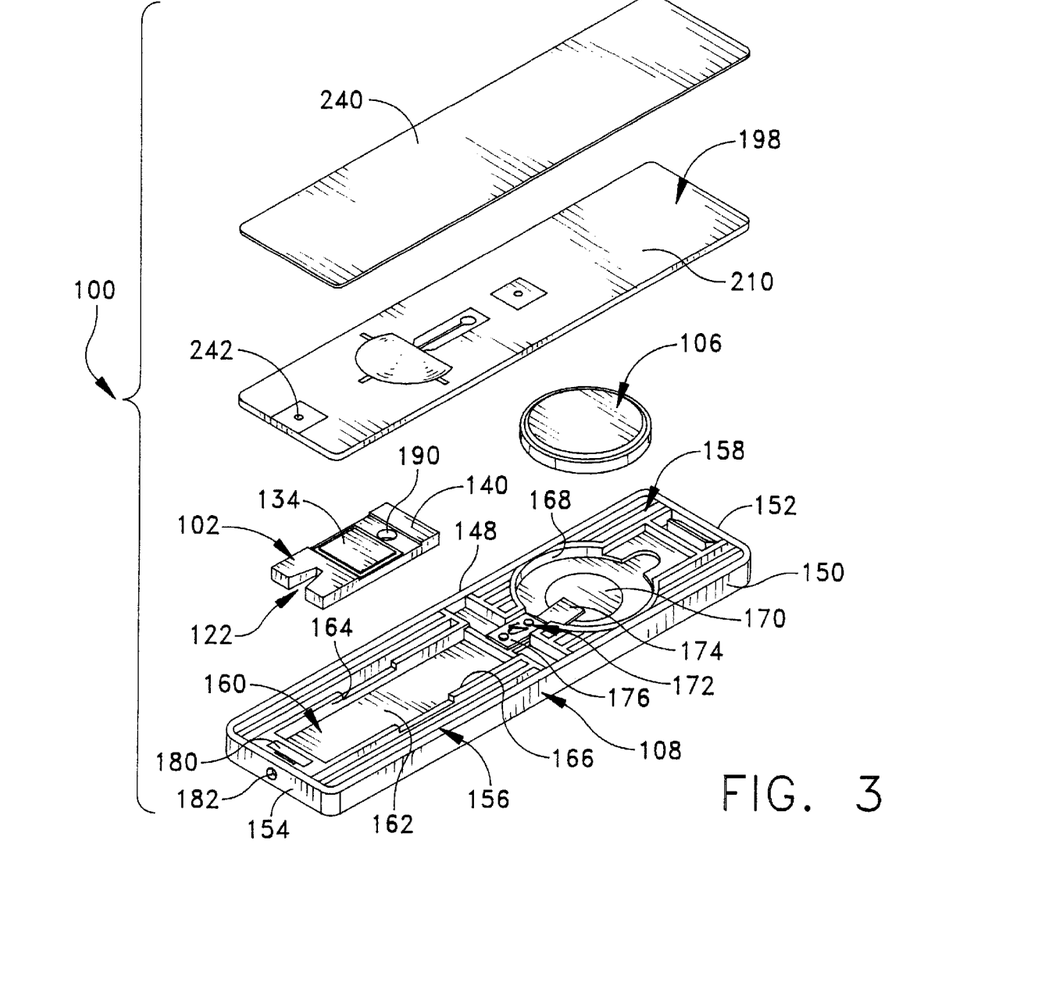
FIG. 3 is an exploded perspective view thereof.
Figure 4:
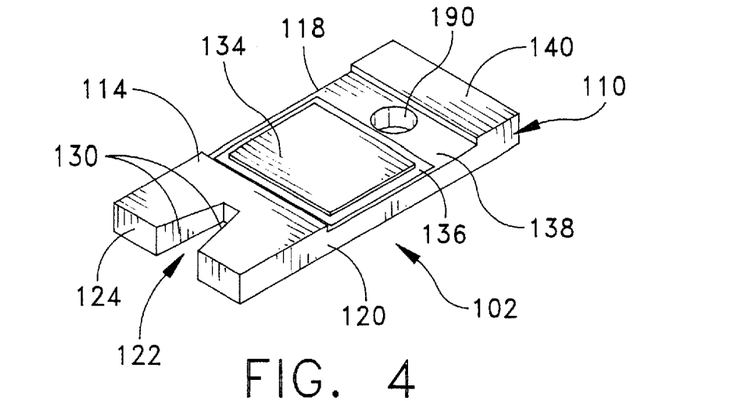
FIG. 4 is a top perspective view of the flat profile laser head assembly.

The housing 108 comprises a shallow rectangular body having a bottom wall 146 and four upwardly extending side walls 148, 150, 152 and 154. In the present construction, the housing 108 is preferably injection molded from a polymer material. However, in other configurations, it is contemplated that the housing 108 could also be molded or formed from a suitable metal material. Referring to FIG. 3, the housing 108 is basically separated into a front portion generally indicated 156 for mounting of the laser head 102 and a rear portion generally indicated at 158 for mounting of the coin cell battery 106. The front portion 156 includes an elongate mounting channel generally indicated at 160 defined by a bottom wall 162 and parallel, spaced interior side walls 164, 166 respectively. The rear portion 158 of the housing 108 includes a circular recess 168 for receiving the coin cell battery 106 therein. The bottom wall 146 of the housing 108 is provided with a removable cover 170 for access and replacement of the battery 106 after assembly. To provide a contact point for the surface of the coin cell battery 106 which faces the bottom wall 146, a thin metal spring plate generally indicated at 172 is mounted within the housing 108. A first end 174 of the spring plate 172 extends into the circular recess 168 to engage the lower surface of the battery 106, while a second end 176 extends outwardly from the recess 168 to provide a separate contact point for the driver circuit 104. Completion of all of the electrical circuits will be further described at a later point within the description.

Figure 14:
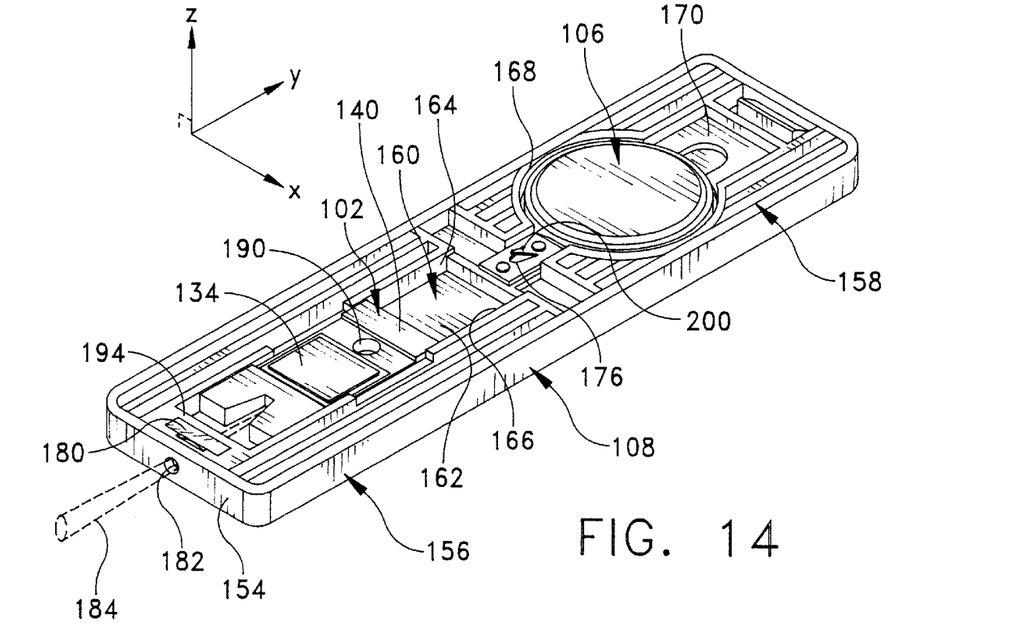
FIGS. 14 and 14A are perspective views of the laser pointer assembly showing movement of the laser head assembly in the mounting channel for focusing of the laser beam.
Figure 14A:
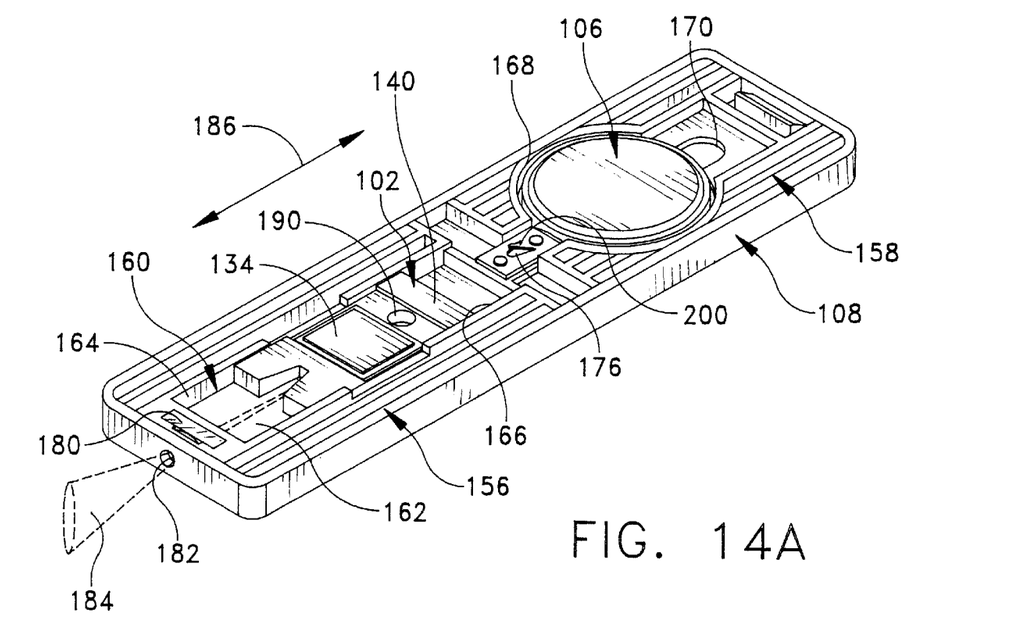
Figure 16:
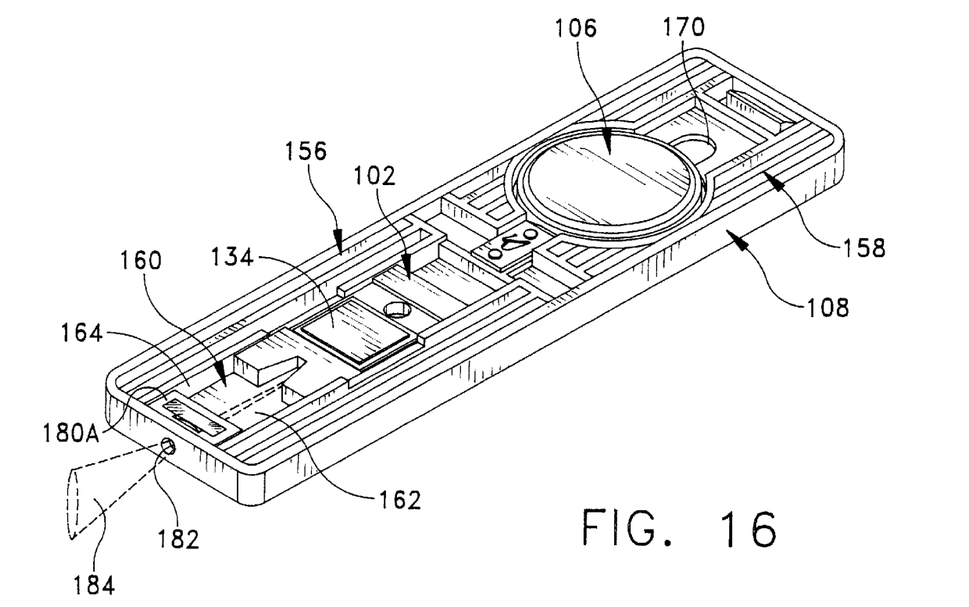
FIG. 16 is a perspective view of an alternate arrangement of the laser pointer assembly showing sliding movement of the lens rather than the laser head for focusing of the laser beam.

During assembly, the laser head 102 sink is slidably received in the elongate rectangular mounting channel 160 formed in the front portion 156 of the housing 108 (See FIGS. 3, 14 and 14A). The lower surface 114 of the heat sink 110 cooperates with the bottom wall 162 of the mounting channel 160 to rigidly fix the laser diode 112 in the Z axis of a 90° angle reference system (See FIGS. 2 and 14) while the parallel side walls 118, 120 of the laser head heat sink 110 and 164, 166 of the mounting channel 160 rigidly fix the laser diode in the X axis of the reference system. When the laser head 102 is received in the mounting channel 160, the mating surfaces of the heat sink 110 and channel 160 further cooperate to permit sliding linear movement of the laser head along a Y axis, which also defines the optical axis (broken line 178 FIG. 2) of the laser diode 112. It is also to be understood that the mating surfaces of the heat sink 110 and the channel 160 also act to fix rotation $\theta_x$, $\theta_y$, and $\theta_z$ of the laser diode 122 around the X, Y and Z axes of the reference system (See FIG. 1). Still referring to FIGS. 3, 14 and 14A, a collimating lens 180 is mounted in the housing 108 at the front end of the channel 160, and a projecting aperture 182 is formed in the front wall 154 of the housing 108 in front of the lens 180. Both the collimating lens 180 and the projecting aperture 182 are located along the optical axis 178 for allowing a laser beam 184 (FIGS. 14 and 14A) to be focused for exit through the front wall 154 of the housing 108. Referring to FIGS. 14 and 14A, the laser beam 184 is focused through the lens 180 by sliding the laser head 102 forwardly or rearwardly in the direction of arrow 186 to the proper longitudinal position. The laser head 102 is secured in focused position in the channel 160 by a drop of adhesive 188 placed in an opening 190 in the rear of the heat sink body 110. It is also contemplated that the longitudinal position of the laser head 102 could be fixed within the channel 160 by a stop block 191 (broken lines FIGS. 11, 11A and 12) positioned on the bottom wall 162 of the channel 160. In large scale manufacturing, it may be possible to accurately estimate the focusing position of the laser head 102 within the channel and identify a suitable location for the stop block. Use of the stop block would facilitate assembly and reduce assembly time. It is also contemplated that focusing of the laser beam 184 could be accomplished by fixing the position of the laser head 102 and providing sliding movement of the lens 180. Referring to FIG. 16, The laser head 102 is fixed in position within the channel 160 by either of the means described above. The lens 180 is be mounted in a lens seat 180A which is in turn slidably received within the forward end of the channel 160. The laser beam 184 is then focused by sliding the lens seat 180A forwardly and/or rearwardly within the channel 160.

One critical aspect to proper functioning of the laser pointer assembly is that the elongate heat sink body 110 provides the necessary rigidity to the housing to prevent longitudinal bending of the plastic housing 108. It can be appreciated by those skilled in the art that the plastic housing 108 could be easily flexed along the longitudinal axis. Such flexing would undoubtedly move the laser diode 112 out of optical alignment with the lens 180 compromising beam quality, or even preventing operation. However, it has been found that the elongate heat sink body 110, which has a length of between about ½ to ¾ the length of the channel 160, provides the necessary rigidity in the longitudinal direction to prevent flexing of the housing 108, at least in the forward channel end thereof, to prevent any misalignment of the diode 112 and the lens 180.

While the housing 108 of the present assembly 100 is specifically illustrated and defined as being substantially rectangular in shape, it is to be understood that the shape of the housing 108 can be modified to other geometric shapes, such as an oval, and/or provided with surface contours as desired by the user. The only structural restriction of the housing 108 is that the mounting channel 160 and laser head 102 must have means which cooperate to fix the laser diode in the "x" and "z" axes while guiding linear movement of the laser diode along the optical "y" axis.

Figure 11:
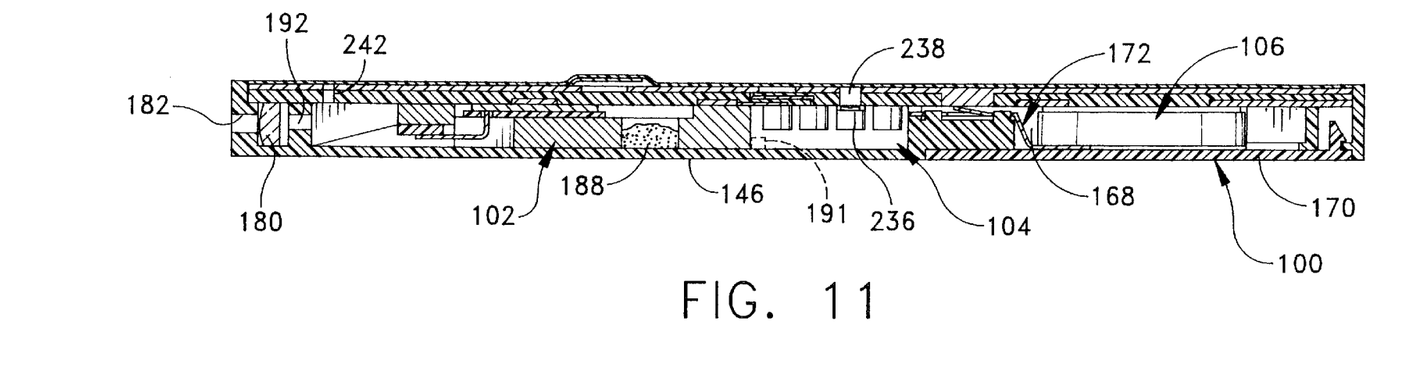
FIG. 11 is a cross-sectional view of the laser pointer assembly as taken along line 11—11 of FIG. 2.
Figure 11A:
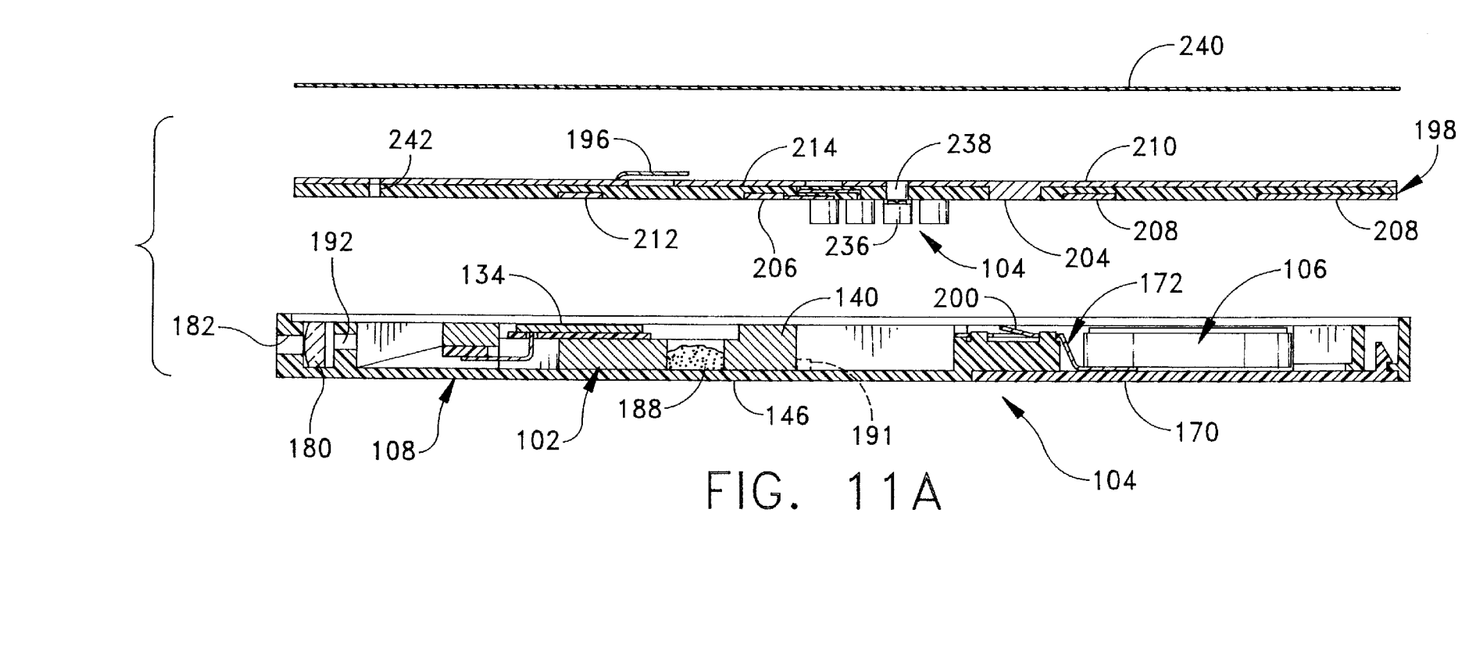
FIG. 11A is an exploded perspective view thereof.
Figure 12:
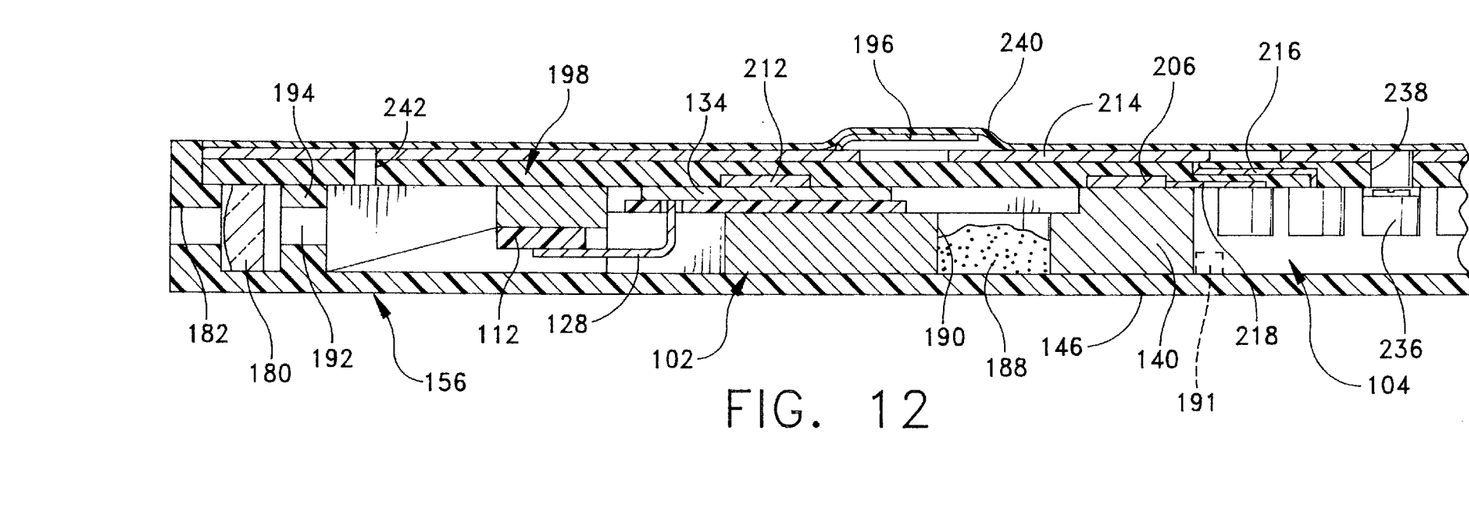
FIG. 12 is a fragmentary enlarged view of the laser head assembly as mounted in the mounting channel.
Figure 13:
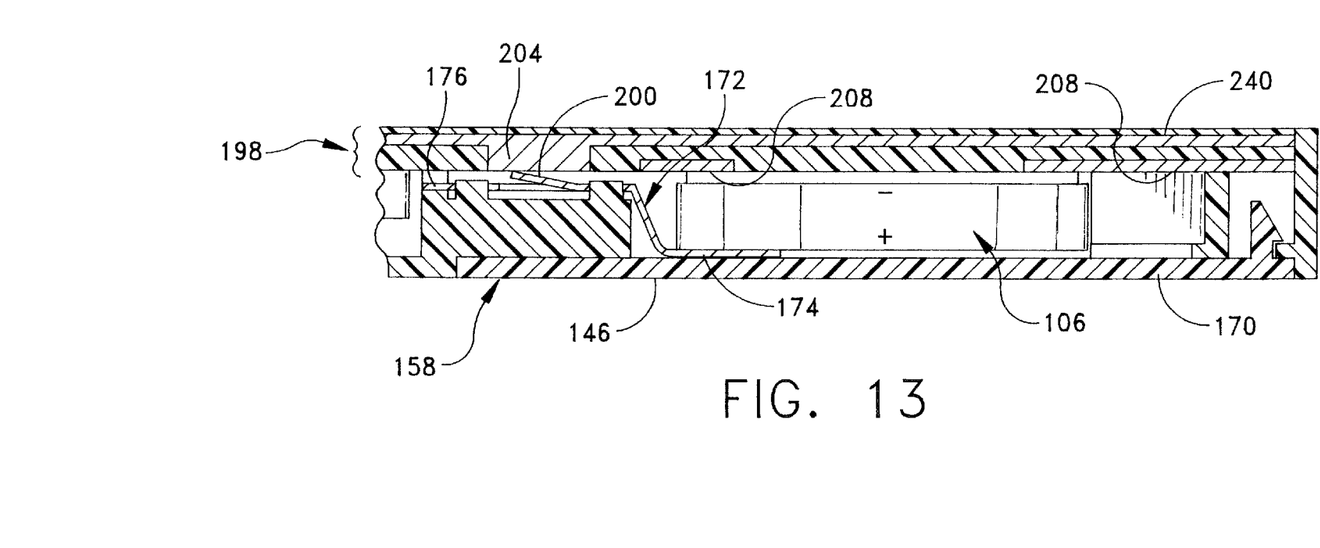
FIG. 13 is a fragmentary enlarged view of the battery assembly.

Turning to FIGS. 11, 11A and 12, the assembly is further provided with an aperture stop 192 located in a wall 194 at the forward end of the channel 160 to narrow the laser light before entering the lens 180. The aperture stop 192 narrows the area of light entering the lens 180 and provides a higher quality beam. While the aperture stop 192 is described as being included in the preferred embodiment, it is to be understood that the aperture stop 192 is not critical to the functionality of the device, and therefore, it description herein should not be interpreted as limiting the claimed structures in any way.

The laser diode driver circuit 104 and a manually actuable biased contact switch 196 are mounted on a two-sided circuit board generally indicated at 198 (FIGS. 8, 9 and 10) which is received and secured over the open top of the shallow housing 108 to form a top wall of the housing 108 (See FIGS. 11 and 11A). The circuit board 198 is secured in position within the housing 108 by an adhesive (not shown) or by other suitable assembly means. Generally speaking, selectively placed pads on the circuit board 198 engage corresponding contact surfaces on the battery 106 and laser head 102 to complete the electrical circuit loop. More specifically, the battery 106 is received in the battery recess 168 with the positive surface facing downwardly. The first end 174 of the spring plate 172 engages the positive surface and carries the positive current to a spring tab 200 formed in the second end 176 of the plate 172. The bottom surface 202 of the circuit board 198 includes first and second positive contact pads 204 and 206, and further includes a large negative contact area 208. When the bottom surface 202 of the circuit board 198 is received onto the housing 108 the spring tab 200 engages the first positive contact pad 204 which carries the positive current through to the upper surface 210 of the circuit board. The second positive contact 206 engages with the positive contact surface 140 on the heat sink body 110. The rear portion of negative contact surface 208 engages with the upwardly facing negative contact surface on the battery 106 and a narrow lateral strip portion 212 of the contact surface 208 engages with the negative contact pad 134 on the upper surface of the laser head 102. Turning to the upper surface 210 of the circuit board 198, the outer edges of the contact switch 196 engage the positive upper surface 210 of the circuit board 198. A contact 214, insulated from the outer portion of the upper surface 210 of the board 198, is located under the contact switch 196 wherein downward pressure of the switch 196 will connect the positive outer portion upper surface 210 of the board 198 to the contact 214. The contact 214 is in turn connected to the laser diode driver circuit 104 on the lower surface 202 of the circuit board 198 by a trace 216 which passes through the board 198. The laser diode driver circuit 104 is connected to the second positive contact pad 206 on the lower surface of the board 198 by another trace 218. Accordingly, when the contact switch 196 is depressed, electrical current runs from the lower surface of the battery 106, through the contact strip 172 to contact pad 204, up to the upper surface 210 of the circuit board 198, through the contact switch 196 to the switch contact 214, down through trace 216 to the laser diode driver circuit 104, through trace 218 to the positive contact pad 206, to surface 140 on the heat sink body 110, through the laser diode 112, through the wire bond 128 to the contact pad 134, to the negative contact strip 212 on the lower surface of the circuit board to the negative terminal of the battery, thus completing the loop.

Turning now to FIG. 7, the laser diode driver circuit 104 utilizes an integrated shunt voltage regulator generally indicated at 220 which monitors voltage across the laser as the battery decays and diverts current flow to provide constant voltage to the laser diode 112. Prior art power regulation circuits for laser diodes typically use a complex feedback circuit to hold light output from the diode constant. In this regard, these circuits use a photodiode monitor located adjacent to the diode to monitor the light level emitted from the diode. This type of feedback circuit can effectively hold the laser brightness relatively constant over a wide range of input voltages to the circuit. It is generally assumed by most engineers that laser diodes are fragile, sensitive and will work best with a photodiode feedback circuit. Most laser head assemblies on the commercial market already have a photodiode sensor built in (See FIG. 1), and therefore most designers make use of the photodiode and design a circuit to use it. Even though the prior art circuits are fairly complex, they nevertheless do not accurately stabilize the brightness of the laser as the battery voltage drops and the ambient temperature varies. This is mostly because the circuits use an inexpensive reference diode and transistors with varying gain as temperature changes. There are integrated circuit series voltage regulator chips that can be used for this purpose with much more accuracy. However, these circuits usually require external components, especially electrolytic and/or tantalum capacitors, to stabilize the circuit. The cost of the circuits is fairly high and the electrolytic capacitors are expensive. Furthermore, capacitors are large and thus make it difficult to truly miniaturize the circuit.

The present circuit design is different from the prior art circuits in that it is based on maintaining constant voltage rather than constant current. The circuit is inexpensive, does not need a feedback photodiode, does not need any capacitors, and is small enough to be made into a single circuit that can be included in a housing package with a laser diode so that the laser diode could be operated directly from a battery without any external circuit.

The brightness of a laser diode is generally specified by a curve relating output brightness to laser current. Minimal operating current, i.e. the point at which lasing begins, is also specified as a current. Unfortunately, the brightness of the laser is also dependant on the temperature of the diode which greatly affects the brightness-current curve. If temperature of the laser diode can be regulated, then the brightness can be controlled by a constant current power supply. However, controlling the temperature of the laser diode is very difficult. The difficulty in controlling temperature led to the now widely accepted idea of using a feedback photodiode to measure light output. This type of circuit is effective, but it needs the photodiode sensor and a more complex circuit. It has been discovered in the present invention that the idea of using constant voltage power supply instead of constant current is in some ways much better than constant current. If one looks at the family of curves for a specific laser, it can be shown that when holding the voltage across the laser diode very constant, i.e. within a few millivolts, the temperature effect will be mostly corrected and brightness maintained. As the temperature goes up, the voltage is constant, but the laser internal resistance goes down, and the current goes up slightly correcting for the temperature shift and giving the laser the added brightness to keep the brightness constant. This is not a feedback system, but a temperature compensation type of system. It is not completely accurate, but is sufficient for uses, such as in laser pointers, and measurement devices, where the apparent brightness to the eye is all that matters.

The present invention uses a different type of voltage regulator called a shunt voltage regulator 220. The shunt voltage regulator 220 is small and comes in three pin package or die. It is inherently stable and does not require any external capacitors. It will keep the voltage constant across the laser diode 112 partly due the operation and discharge effects of coin cell lithium batteries, such as 106, but can also be used with other batteries. It will allow the coin cell 106 to be discharged until its output is as low as the voltage required for the laser diode, or in other words, a near zero voltage dropout regulator. This allows the circuit to drain most of the available power out of the small batteries. Since the circuit consists only of the shunt voltage regulator 220 and a few resistors, the entire circuit can be placed into the housing with the laser.

The integrated shunt voltage regulator preferably comprises a National Semiconductor LM4041DIM3-ADJ, but other shunt voltage regulators are also acceptable. The shunt voltage regulator 220 has only three pins. Two of the pins 222, and 224 are power and ground, respectively. The third pin 226 is the adjustment pin. The shunt voltage regulator 220 has inside of it a bandgap voltage reference. This is a very stable reference. This reference is compared with the voltage across the adjustment pin 226 of the circuit. If this voltage is the same as the reference inside the chip, then nothing happens. If the voltage is higher than the reference, then the chip amplifier inside starts to draw more current from the battery 106 or other power supply. This increased loading of the shunt voltage regulator 220 drains more power from the battery 106 and if there is some series resistance in the battery, or a resistor in series with the chip, then the voltage across the chip decreases and the voltage becomes stable. Since one can put a voltage divider across the power and ground pins 222, 224 of the shunt voltage regulator 220 and send this signal to the adjustment pin 226, the voltage across the shunt voltage regulator 220 can be adjusted to be held constant at any voltage from the 1.23 Volt band gap reference voltage to the voltage of the battery 106. In the present circuit, a fixed resistor and an adjustable resistor create a voltage divider that is set to approximately 2.14 V, the laser operating point.

Referring to FIG. 7, a series resistor (R1) 228 of approximately 6 ohms is in series with the 3 v battery 106, but the internal resistance of the battery 106 is also added to this resistance. The voltage divider generally indicated at 230 consisting of resistors 232 (R2) and 234 (R3) and a potentiometer 236 (R4) divides the 2.14 volts across the 220 to make a voltage signal of about 1.23 volts to compare to the internal 1.23 v reference. The laser diode 112 is hooked directly across the power of the shunt voltage regulator 220. With the proper selection of R1, when a fresh battery is used, the initial voltage of the battery is about 2.6 volts under the heavy load of about 30 ma for the laser and about 30 ma for the integrated circuit. The laser diode driver circuit 104 is straining heavily at this point to drag about 2.6 volts through the 6 ohm resistor 228 down to the 2.14 volts needed for the laser 112. As the battery 106 fatigues, its internal resistance goes up and less current is needed to be drawn by the IC. With each successive pressing of the laser switch, the battery voltage is getting to be less and less. The IC therefore does not draw as much current as it did before. Eventually, the battery voltage will get so low that under the 30 ma load of the laser only, the battery will be down to about 2.14 volts and the IC will not draw any additional current. The voltage across the laser 112 will still be about 2.14 volts as it has been since the battery was new. As the battery goes down past about 2.14 volts under load, the laser 112 will finally start to dim down from running from a lower voltage.

It is true that this laser diode driver circuit 104 draws more power from the battery 106 than the laser 112 draws on its own. This can be as much as double the current of the laser 112 when the battery is fresh. There is sufficient power however in the battery to supply this load for an adequately long time to please a user. With a series 2025 3 v coin cell, and a 30 ma laser, using a 50 percent duty cycle with 3 seconds on and 3 seconds off, the circuit ran for over 2 hours before any apparent dimming of the laser was noticed.

By the addition of one or two external inexpensive bipolar transistors to the circuit, the shunt voltage regulator 220 will work with higher currents. This can be thus used for laser diodes that draw much greater power. Capacitors would still not be required for stability of the circuit.

Referring to FIGS. 11, 11A and 12, the potentiometer 230 comprises a bottom adjust potentiometer. Since the circuit components are mounted on the bottom side 202 of the circuit board 198, the circuit board 198 is provided with a small opening 238 for access to the bottom adjustment screw of the potentiometer 236.

Since the circuit 104 does not require that the laser 112 have a photodiode feedback loop, the laser 112 can be packaged onto flat alternate packages that allow for laser pointers, gun sights, carpenter's levels and other products to be built that are very thin and not constrained by the round standard laser packages.

Referring to FIGS. 2, 3, 11, and 11A, the assembly 100 still further comprises a decorative overlay sheet or panel 240 for concealing and protecting the upper surface of the circuit board 198. The overlay sheet 240 is preferably constructed from an opaque plastic, and is secured to the top surface of the circuit board 198 with an adhesive. The overlay panel 240 protects and hides the electronic surface of the circuit board 198 and can be provided with custom logo imprints for customized marketing of the laser pointer 100.

Referring to FIGS. 3, 8, 9, 11 and 12, the circuit board 198 is provided with a small aperture 242 adjacent the front edge thereof The aperture 242 sits over the front end of the channel 160 which is filled with light when the laser 112 is energized, and creates a small indicator light which saturates through the overlay sheet 240 to create a power indicator light on the upper surface of the housing 108.

Figure 15:
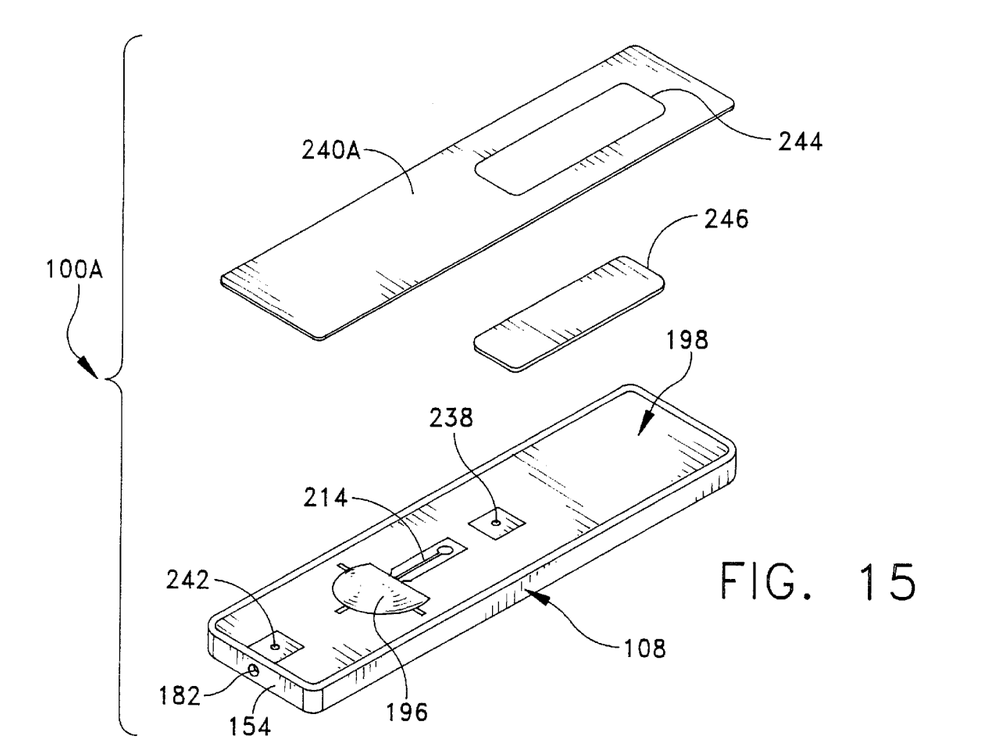
FIG. 15 is an exploded perspective view of an alternative embodiment of the laser pointer assembly showing an alternate cover panel assembly.

Referring to FIG. 15, an alternate embodiment of the assembly 100A is illustrated with an alternate form of overlay sheet 240A. In this embodiment 100A, the overlay sheet 240A is provided with a clear window 244 for personalized marketing. A company or individual name can be printed on a separate label 246 which is applied to the surface of the circuit board 198, and then the protective overlay 240A secured over the name panel 244 so that the name panel 246 is exposed through the clear window 244 of the overlay 240A.

While the instant laser pointer device 100 has been designed and illustrated for intended use as a hand held laser pointing device, it is to be understood that the concepts utilized in developing the present hand held pointer can be equally applied to other types of laser pointer devices. For example, the thin profile laser head assembly could be integrated into a construction level. In this regard, the housing 108 could be significantly reduced in length by eliminating the integrated power source (battery) and providing lead lines to the circuit 104 to energize the circuit from an external power source. When used in an application such as a construction level, the power source, as well as the switch, could be located at a different location in the construction level housing leaving only the forward portion of the housing structure as illustrated. Likewise, one skilled in the art will recognize that there is excess unused space along the sides of the mounting channel and that these areas could be eliminated to reduce the overall width of the housing, and the circuit board could be redesigned to be narrower in width as well.

It can therefore be seen that the instant invention provides the following: a laser pointer assembly having a thin profile housing; a laser pointer assembly including a thin profile laser head assembly; a laser pointer assembly wherein the laser head assembly is slidably mounted in an elongate channel; a laser pointer assembly wherein the laser head assembly and the mounting channel rigidly fix the laser diode in X and Z axes of a 90° angle reference system while also permitting linear sliding movement in the Y axis; a laser pointer assembly wherein the laser head assembly and the mounting channel rigidly fix rotation $\theta_x$, $\theta_y$, and $\theta_z$ around the X, Y and Z axes without the need for adjustment; a laser pointer assembly wherein a collimating lens is mounted at the forward end of the mounting channel and focusing of the laser beam is accomplished by sliding the laser head assembly forward and backward within the mounting channel; a laser head assembly wherein the laser diode is mounted on a recessed shelf of a heat sink body to protect the laser diode and wire bond from harm during handling and manufacturing; a laser pointer assembly including a power regulator circuit which operates on constant voltage rather than constant current; a laser pointer assembly having a power regulator circuit which has no photodiode feedback loop; a laser pointer assembly having a power regulator circuit which uses a shunt-type voltage regulator; and a laser pointer assembly having a power regulator circuit with a shunt-type voltage regulator that uses the internal resistance of the battery to optimize power drain from the battery. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A laser pointer assembly comprising:
   a laser head including a heat sink and a laser diode mounted on said heat sink, said laser head having opposing top and bottom walls, said laser head including a recessed shelf on one of said top and bottom walls, said recessed shelf being located adjacent to a front edge of said laser head, said laser diode being mounted on said recessed shelf, said laser diode emitting a laser beam;
   a laser diode driver circuit electrically connected to said laser diode;
   a power source electrically connected to said laser diode driver circuit;
   a housing containing said laser head and said laser diode driver circuit, said housing including a mounting channel receiving said laser head, said mounting channel and said laser head cooperating to position said laser diode along an optical axis, said mounting channel further cooperating with said laser head to rigidly fix said laser diode in X and Z axes of a 90° reference angle reference system, said reference system also including a Y axis defining the optical axis extending longitudinally along said housing, said mounting channel cooperating further with said laser head to rigidly fix rotation $\theta_x$, $\theta_y$, and $\theta_z$ of said laser diode around the X, Y and Z axes of said reference system, said housing further including a projecting aperture aligned along the optical axis; and
   a lens aligned on said optical axis between the laser diode and the projecting aperture.

2. The laser pointer assembly of claim 1 wherein said recessed shelf is positioned about halfway between the top and bottom walls of said laser head.

3. The laser pointer of claim 1 wherein said laser head includes a slot extending inwardly from said front edge thereof, said recessed shelf being located at an inner end of the slot.

4. The laser pointer assembly of claim 3 wherein said recessed shelf is positioned about halfway between the top and bottom walls of said laser head.

5. A laser pointer assembly comprising:
   a laser head including a heat sink and a laser diode mounted on said heat sink, said laser diode emitting a laser beam;
   a laser diode driver circuit electrically connected to said laser diode;
   a power source electrically connected to said laser diode driver circuit, said power source comprising battery means having a predetermined output voltage for providing electrical power to said laser diode, and said laser diode driver circuit comprising resistor means for reducing said output voltage to a predetermined operating circuit voltage and voltage regulator means for maintaining said operating circuit voltage constant across the terminals of the laser diode, said voltage regulator means comprising a shunt regulator, said shunt regulator being operable for monitoring operating circuit voltage, comparing the operating circuit voltage with an internal reference voltage, and selectively drawing a current level from the battery responsive to the operating circuit voltage to maintain a constant power level to the laser,
   a housing containing said laser head and said laser diode driver circuit, said housing including a mounting channel receiving said laser head, said mounting channel and said laser head cooperating to position said laser diode along an optical axis, said mounting channel further cooperating with said laser head to rigidly fix said laser diode in X and Z axes of a 90° reference angle reference system, said reference system also including a Y axis defining the optical axis extending longitudinally along said housing, said mounting channel cooperating further with said laser head to rigidly fix rotation $\theta_x$, $\theta_y$, and $\theta_z$ of said laser diode around the X, Y and Z axes of said reference system, said housing further including a projecting aperture aligned along the optical axis; and
   a lens aligned on said optical axis between the laser diode and the projecting aperture.

6. The laser pointer assembly of claim 5 further comprising a voltage divider connected in parallel with the laser diode, said voltage divider reducing the operating voltage to a voltage substantially equal to the reference voltage, said shunt regulator including an adjustment input coupled to the voltage divider for providing a means to compare the operating circuit voltage to the internal reference voltage.

7. The laser pointer assembly of claim 6 wherein said battery means comprises a coin cell lithium battery.

8. A thin profile laser pointer assembly comprising:
   a thin profile, flat planar laser head having opposing parallel side edges;
   a laser diode mounted on said laser head;
   a laser diode driver circuit electrically connected to said laser diode;
   a power source electrically connected to said laser diode driver circuit;
   a thin profile, flat planar housing having a shallow, flat planar longitudinally rectangular mounting channel formed therein, said mounting channel having parallel opposing side edges, said laser head being slidably received within said mounting channel wherein said opposing side edges of said laser head and said mounting channel slidably engage in mating cooperate to position said laser diode on an optical axis extending longitudinally through said mounting channel, said housing further including a projecting aperture aligned along said optical axis; and a lens positioned in the housing along said optical axis between said laser diode and said projecting aperture, said laser head being slidably movable along said mounting channel during assembly of said laser pointer such that said laser diode sidably moves along said optical axis for focusing of said laser beam, said laser head thereafter being permanently fixed in focused position by a fixing agent during said assembly.

9. In the laser pointer assembly of claim 8, said mounting channel having a bottom wall which extends parallel to said optical axis, said laser head having a bottom wall which matingly engages said bottom wall of said mounting channel.

10. In the laser pointer assembly of claim 8, said laser head having opposing top and bottom walls, said laser head including a recessed shelf on one of said top and bottom walls, said recessed shelf being located adjacent to a front edge of sad laser head, said laser diode being mounted on said recessed shelf.

11. In the laser pointer assembly of claim 8, said power source comprising a battery having a predetermined output voltage, said laser diode driver circuit comprising resistor means electrically connected to said power source for reducing said output voltage to a predetermined operating circuit voltage and voltage regulator means for maintaining said operating circuit voltage constant across the laser diode.

12. In the laser pointer assembly of claim 11, said voltage regulator means comprising a shunt voltage regulator, said shunt voltage regulator monitoring operating circuit voltage, comparing the operating circuit voltage with an internal reference voltage, and selectively drawing a current level from the battery responsive to the operating circuit voltage to maintain a constant power level to the laser diode.

13. A thin profile laser pointer assembly comprising:

a thin profile, flat planar laser head having opposing parallel side edges;

a laser diode mounted on said laser head;

a laser diode driver circuit electrically connected to said laser diode;

a power source electrically connected to said laser diode driver circuit;

a thin profile, flat planar housing having a shallow, flat planar longitudinally rectangular mounting channel formed therein, said mounting channel having parallel opposing side edges, said laser head being received within said mounting channel wherein said opposing side edges of said laser head and said mounting channel matingly engage and cooperate to position said laser diode on an optical axis extending longitudinally through said mounting channel, said housing further including a projecting aperture aligned along said optical axis; and a lens slidably mounted in said mounting channel on said optical axis between said laser diode and said projecting aperture, said lens being slidably movable along said mounting channel during assembly of said laser pointer for focusing of said laser beam, said lens being thereafter permanently fixed in focused position by a fixing agent during said assembly.

14. In the laser pointer assembly of claim 13, said mounting channel having a bottom wall extends parallel said optical axis, said laser head having a bottom wall which matingly engages said bottom and side walls of said mounting channel.

15. In the laser pointer assembly of claim 13, said laser head having opposing top and bottom walls, said laser head including a recessed shelf on one of said top and bottom walls, said recessed shelf being located adjacent to a front edge of said laser head, said laser diode being mounted on said recessed shelf.

16. In the laser pointer assembly of claim 13, said power source comprising a battery having a predetermined output voltage, said laser diode driver circuit comprising resistor means electrically connected to said power source for reducing said output voltage to a predetermined operating circuit voltage and voltage regulator means for maintaining said operating circuit voltage constant across the laser diode.

17. In the laser pointer assembly of claim 16, said voltage regulator means comprising a shunt voltage regulator, said shunt voltage regulator monitoring operating circuit voltage, comparing the operating circuit voltage with an internal reference voltage, and selectively drawing a current level from the battery responsive to the operating circuit voltage to maintain a constant power level to the laser diode.

18. A thin profile laser pointer assembly comprising:

a thin profile, flat planar laser head comprising a thin profile, flat planar heat sink and a laser diode mounted on the heat sink, said heat sink having upper and lower surfaces, said upper surface having first and second spaced electrical contacts electrically connected to said laser diode;

a thin profile, flat planar housing having a bottom wall and side walls extending upwardly from the bottom wall to define an open interior of said housing, said housing having a predetermined peripheral edge margin and a shallow, longitudinally extending mounting channel formed on said bottom wall thereof, said laser head being received within said mounting channel with said lower surface received in facing relation with said bottom wall of said housing and said two electrical contacts facing upwardly, said laser head and said mounting channel further including corresponding mating surfaces which cooperate to position said laser diode on an optical axis extending longitudinally through said mounting channel, said housing further including a projecting aperture aligned on said optical axis;

a lens positioned in the housing along said optical axis between said laser diode and said projecting aperture;

a coin cell battery received within a cavity formed in said interior of said housing, said battery having a first contact surface facing upwardly and a second contact surface facing downwardly;

an electrical contact having a first end positioned in said cavity and a second end which extends out of said cavity, said first end contacting said second contact surface of said battery; and a circuit board having a peripheral edge margin identical to that of said housing, said circuit board having a laser diode driver circuit formed thereon, said circuit board having a downwardly facing surface including first and second laser head contacts and first and second battery contacts which are electrically connected to said laser diode driver circuit for powering said laser diode, said circuit board being received in assembled relation over said interior of said housing to form a cover of said housing wherein said first and second laser head contacts respectively engage said first and second spaced contacts on said laser head, and said first and second battery contacts respectively engage said first contact surface of said coin cell battery and said second end of said electrical contact.

19. The laser pointer assembly of claim 18 wherein said integrated circuit includes a switch electrically connected to said laser diode circuit.

20. The laser pointer assembly of claim 19 wherein said switch is formed on an upper surface of said integrated circuit board.

21. The laser pointer assembly of claim 18 further including a label received over an upper surface of said integrated circuit board.

22. The laser pointer assembly of claim 20 further including a label received over an upper surface of said integrated circuit board.

* * * * *